US011650801B2

(12) United States Patent
Le et al.

(10) Patent No.: US 11,650,801 B2
(45) Date of Patent: *May 16, 2023

(54) DETERMINING WHEN TO PERFORM AND PERFORMING RUNTIME BINARY SLIMMING

(71) Applicant: International Business Machines Corporation, Armonk, NY (US)

(72) Inventors: Michael Vu Le, Danbury, CT (US); Ian Michael Molloy, Chappaqua, NY (US); Taemin Park, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,048

(22) Filed: Nov. 10, 2021

(65) Prior Publication Data

US 2022/0066757 A1    Mar. 3, 2022

Related U.S. Application Data

(63) Continuation of application No. 16/786,284, filed on Feb. 10, 2020, now Pat. No. 11,221,835.

(51) Int. Cl.
  *G06F 9/44* (2018.01)
  *G06F 8/41* (2018.01)
  *G06F 11/36* (2006.01)

(52) U.S. Cl.
  CPC ........ *G06F 8/4434* (2013.01); *G06F 11/3612* (2013.01)

(58) Field of Classification Search
  None
  See application file for complete search history.

(56) References Cited

U.S. PATENT DOCUMENTS

| 6,446,254 | B1 | 9/2002 | Chapman et al. |
| 8,549,498 | B2* | 10/2013 | Hayashizaki ....... G06F 11/3612 |
| | | | 717/148 |
| 10,078,510 | B1 | 9/2018 | Powers |
| 10,592,215 | B1 | 3/2020 | Eyberg |
| 2002/0013938 | A1 | 1/2002 | Duesterwald |
| 2005/0246378 | A1 | 11/2005 | Hunt |
| 2009/0187887 | A1 | 7/2009 | Richins |
| 2009/0293051 | A1 | 11/2009 | Krywaniuk |
| 2010/0131932 | A1 | 5/2010 | Kato |
| 2010/0169624 | A1 | 7/2010 | Yamamoto |
| 2010/0299657 | A1 | 11/2010 | Barua |
| 2010/0306746 | A1 | 12/2010 | Barua |

(Continued)

FOREIGN PATENT DOCUMENTS

JP        6531927 B1    6/2019

OTHER PUBLICATIONS

IBM Appendix P: List of IBM Patents or Patent Applications Treated as Related.

*Primary Examiner* — Insun Kang
(74) *Attorney, Agent, or Firm* — Harrington & Smith

(57) ABSTRACT

Multiple execution traces of an application are accessed. The multiple execution traces have been collected at a basic block level. Basic blocks in the multiple execution traces are scored. Scores for the basic blocks represent benefits of performing binary slimming at the corresponding basic blocks. Runtime binary slimming is performed of the application based on the scores of the basic blocks.

18 Claims, 7 Drawing Sheets

(56) References Cited

U.S. PATENT DOCUMENTS

| | | |
|---|---|---|
| 2011/0060895 A1 | 3/2011 | Solomon |
| 2011/0066829 A1 | 3/2011 | Tye |
| 2011/0067018 A1 | 3/2011 | Kawachiya |
| 2012/0317560 A1 | 12/2012 | Kawahito |
| 2013/0031537 A1 | 1/2013 | Boehm |
| 2013/0205286 A1 | 8/2013 | Barraclough |
| 2014/0281434 A1 | 9/2014 | Madriles |
| 2014/0344791 A1 | 11/2014 | Yang |
| 2015/0205586 A1 | 7/2015 | Diamos |
| 2015/0234652 A1 | 8/2015 | Naveh |
| 2015/0277880 A1 | 10/2015 | Gschwind |
| 2016/0021121 A1 | 1/2016 | Cui |
| 2016/0041824 A1 | 2/2016 | Bostick |
| 2016/0117229 A1 | 4/2016 | Epstein |
| 2017/0344349 A1 | 11/2017 | He |
| 2018/0203676 A1 | 7/2018 | Howe |
| 2019/0102150 A1 | 4/2019 | Venkatasubramanian |
| 2019/0235985 A1* | 8/2019 | Idicula ................ G06F 11/3457 |
| 2020/0159509 A1 | 5/2020 | Douglas |
| 2020/0278876 A1 | 9/2020 | Douglas |
| 2020/0341741 A1 | 10/2020 | Brooker |

\* cited by examiner

```
def get_rewriting_location_and_blacklist:
    total_insts_count = 0
    for trace_i in profiled data:
        basic_block = decode(trace_i)
        basic_block.visits += 1
        if basic_block first appear:
            total_insts_count += get_inst_count(basic_block)

utility_max = 0
    rewritingLocation = None
    blackList_final = None
    for trace_i in profiled data:
        basic_block = decode(trace_i)
        basic_block.visits -= 1
        if basic_block.visits == 0:
            blacklist_i = blacklist_{i-1} U basicblock
            dead_insts_count = count_insts(blacklist_i)
            reduction = dead_insts_count / total_insts_count
            utility = reduction * earliness_i
            if utility > utility_max:
                utility_max = utility
                rewritingLocation = basic_block
                blackList_final = blacklist_i return rewritingLocation, blackList_final
```

Listing 1: Heuristic algorithm to find the rewriting location and blacklist.

FIG. 3

DETERMINING WHEN TO PERFORM AND PERFORMING RUNTIME BINARY SLIMMING

BACKGROUND

This invention relates generally to security exploits on computer systems and, more specifically, relates to performing runtime binary slimming.

A code-reuse attack on a computer system is a security exploit that reuses existing instructions in an application to execute arbitrary code on a compromised computer system. Such attacks include return-oriented programming and a variant called jump-oriented programming. In return-oriented programming, an attacker gains control of the call stack to hijack program control flow and then executes carefully chosen machine instruction sequences, called "gadgets", that are already present in the machine's memory. Each gadget typically ends in a return instruction and is located in a subroutine within the existing program and/or shared library code. Chained together, these gadgets allow an attacker to perform arbitrary operations on a machine employing defenses that thwart simpler attacks.

Control-flow hijack is a precursor to a code-reuse attack. Control-flow hijack is a type of attack that makes use of memory corruption to redirect the flow of execution to a location controlled by an attacker. This area may contain existing instructions (thus, the code reuse, which is a focus of the exemplary embodiments described below) or instructions injected by an attacker.

These types of attacks are advanced types of attacks that can be used to circumvent modern security checks and hardening efforts. The more instructions to which an attacker has access, the more likely the success of the attack. The term "binary attack surface area" is used to quantify the amount of instructions to which an attacker has access, and refers to the amount of code, including code in an application and any code that application can access, e.g., in libraries, APIs (application programming interfaces), and the like, that can be accessed/manipulated by an attacker to compromise a system.

The binary attack surface area may be reduced in a number of ways, such as eliminating unused code for running a program.

SUMMARY

This section is meant to be exemplary and not meant to be limiting.

An exemplary embodiment is a method, comprising accessing one or more execution traces of an application. The one or more execution traces have been collected at a basic block level. The method includes scoring basic blocks in the one or more execution traces, wherein scores for the basic blocks represent benefits of performing binary slimming at the corresponding basic blocks. The method also includes performing runtime binary slimming of the application based on the scores of the basic blocks.

Another exemplary embodiment is an apparatus, comprising one or more memories having computer-readable code thereon. The apparatus also includes one or more processors. The one or more processors, in response to retrieval and execution of the computer-readable code, cause the apparatus to perform operations comprising accessing one or more execution traces of an application, wherein the one or more execution traces have been collected at a basic block level. The operations also comprise scoring basic blocks in the one or more execution traces, wherein scores for the basic blocks represent benefits of performing binary slimming at the corresponding basic blocks. The operations further comprise performing runtime binary slimming of the application based on the scores of the basic blocks.

A further exemplary embodiment is a computer program product comprising a computer readable storage medium having program instructions embodied therewith. The program instructions are executable by a computer system to cause the computer system to perform operations comprising accessing one or more execution traces of an application, wherein the one or more execution traces have been collected at a basic block level. The operations also include scoring basic blocks in the one or more execution traces, wherein scores for the basic blocks represent benefits of performing binary slimming at the corresponding basic blocks. The operations include performing runtime binary slimming of the application based on the scores of the basic blocks.

BRIEF DESCRIPTION OF THE SEVERAL VIEWS OF THE DRAWINGS

FIG. 3 is an illustration of a listing of code ("Listing 1"), illustrating an exemplary heuristic algorithm to find a rewriting location and blacklist in an exemplary embodiment;

DETAILED DESCRIPTION

Figure 1A:
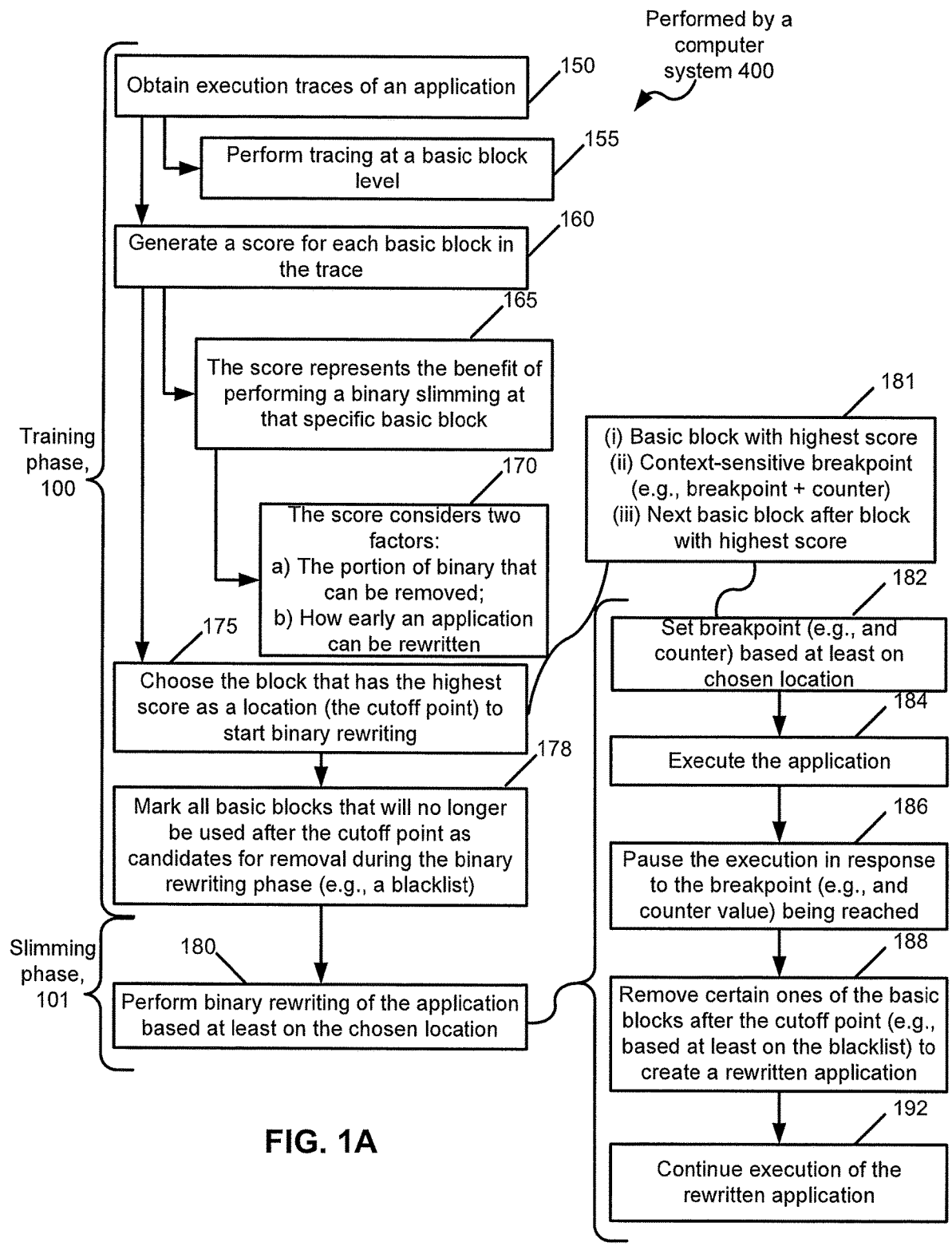
FIG. 1A is a block diagram of a method for determining when to perform and performing runtime binary slimming, in accordance with an exemplary embodiment.

The following abbreviations that may be found in the specification and/or the drawing figures are defined as follows:

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described above, existing techniques for reducing binary attack surface area also include eliminating unused code before running a program, such as the following:

1) Omit unnecessary components when a program is compiled;

2) Patch a binary file to remove unused instructions; and

3) Load only used components on memory at the start of a program.

While eliminating unused codes before running a program, this also requires access to the code, and perhaps the source code, prior to program execution. This may not be possible or may cause other issues, such as a delay in program execution.

The binary attack surface area may be reduced in a number of ways, including binary rewriting. This binary rewriting may occur during program execution, which alleviates any issues caused by trying to eliminate unused codes before running a program.

Technical problems still exist with performing binary rewriting during program execution, however. In particular, it is unclear how to select when, during a program execution, to pause the program and perform binary rewriting to eliminate unused instructions in the program's memory area. Pick too many locations, and then overhead of binary rewriting would be high. Pick too soon during execution, and then miss opportunities for further code surface reduction. Pick too late, and then application is vulnerable for much longer than is necessary.

To address these and other issues, and as an introduction, an exemplary goal of certain embodiments herein is to find a location to start binary rewriting, maximizing the benefits of runtime binary "debloating", that is, slimming (e.g., removing) code that serves no useful purpose or is no longer needed after a certain point. An exemplary solution involves a heuristic-based discovery algorithm to find a location to start runtime binary slimming.

Advantages include, but are not limited to, one or more of the following:

1) automatically finding a location for runtime binary slimming without manual effort;

2) improving or maximizing code surface area reduction; and/or 3) using techniques compatible with any application.

The inventors have realized that if one was to perform rewriting towards the end of the application's execution lifetime, then one will have maximized code removal but that will not be very useful, as the application's execution is about to terminate. Hence, an exemplary heuristic used herein gives more weight to locations at the beginning of the application's execution lifetime.

Advantages of these techniques include but are not limited to the following: exemplary embodiments propose techniques for discovering a location to perform runtime binary slimming; and/or the exemplary embodiments can be used to achieve more aggressive code removal (the code removal part of slimming) resulting in a smaller application attack surface area.

Certain exemplary embodiments combine proposed algorithms with mechanisms to perform runtime binary slimming. These can be used to enhance the security of cloud platforms or servers, for example, by decreasing the chance of a hosted application from being successfully attacked and exploited. These additionally have ease of use by customers, as the proposed techniques do not involve changes to an application or require access to source code.

Before proceeding with additional detail regarding exemplary embodiments, it is helpful to address some terminology. Program code will also be referred to as instructions, as program code is a set of instructions. The terms application and program may be used interchangeably. Thus, "program code" and "application code" are considered to be the same. Also, "program code" and/or "application code" may be shortened to "code". It is further noted that quotation marks are used herein for elements of a program (e.g., "main loop", "reduction", "earliness", and "utility").

Now that an introduction has been provided, additional detail is provided. In a dynamic binary rewriting scheme, one key challenge is to find the point (referred to as a cutoff point) in the target program from which to initiate the binary rewriting task. Selecting a good cutoff point is important in maximizing the amount of code that can be removed from the target program as well as maximizing the security benefits to be had. The ideal location of this cutoff point should be as close to the start of the "main loop" of the program—comprising the main task of the application—as much as possible. Unfortunately, the cutoff point is not easily determined without having access to source code.

Figure 1B:
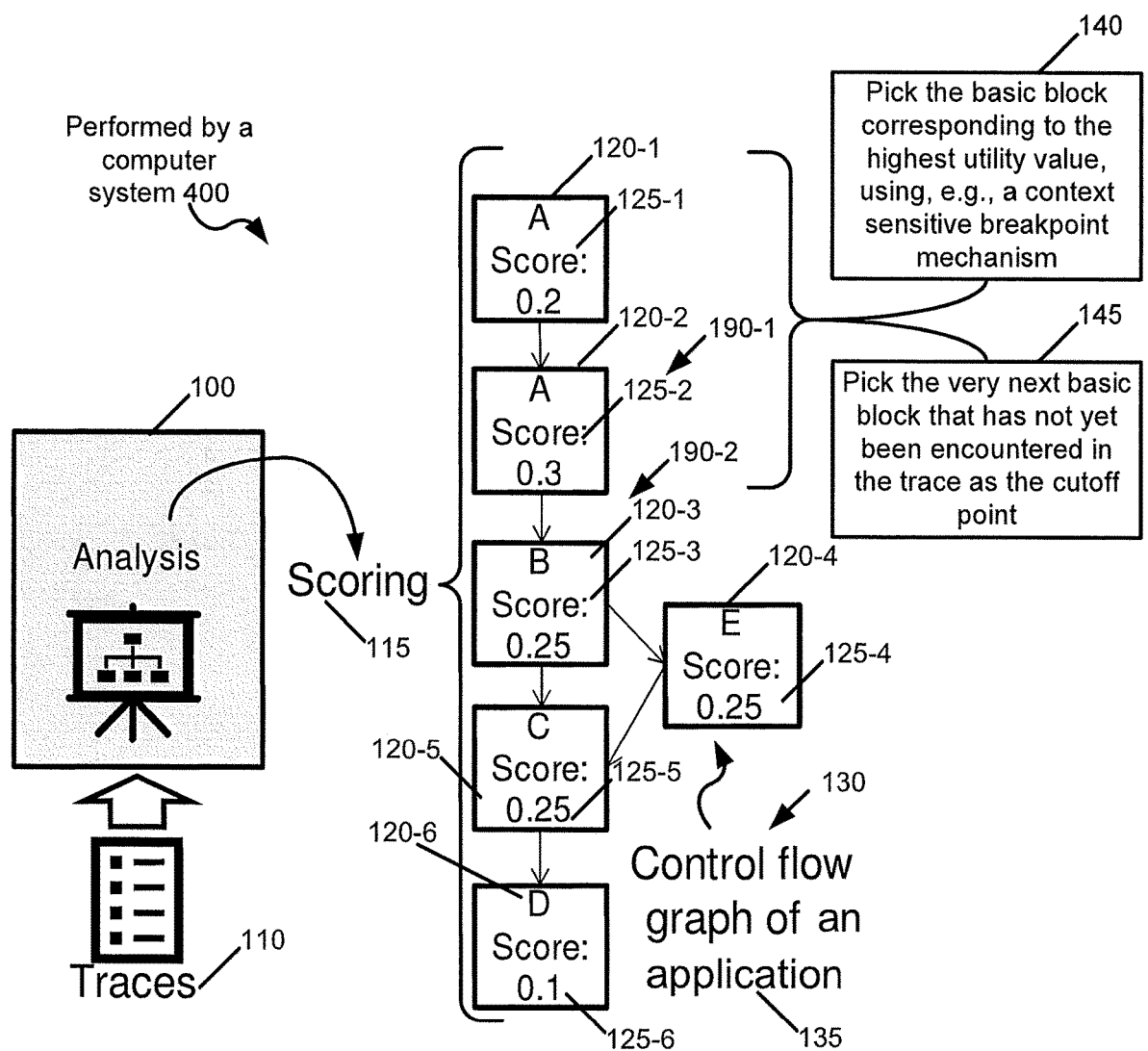
FIG. 1B is a block diagram of a visualization of an analysis method from FIG. 1A and data produced during the method, in accordance with an exemplary embodiment.

Applicants have, however, determined a heuristic approach to solve these problems, relying on the application's binary code and an execution trace of the program. FIGS. 1A and 1B are used to describe exemplary embodiments for the heuristic approach. FIG. 1A is a block diagram of a method for determining when to perform and performing runtime binary slimming, in accordance with an exemplary embodiment. FIG. 1B is a block diagram of a visualization of an analysis method from FIG. 1A and data produced during the method, in accordance with an exemplary embodiment. These blocks illustrate the operation of an exemplary method or methods, a result of execution of computer program instructions embodied on a computer readable memory, functions performed by logic implemented in hardware, and/or interconnected means for performing functions in accordance with exemplary embodiments. These exemplary embodiments would be performed by a computer system 400 such as a server or a cloud computing environment implementing a service to perform the exemplary embodiments. These exemplary computer systems 400 are described in more detail below in reference to FIGS. 4-6.

A training phase 100 is illustrated in both FIGS. 1A and 1B. FIG. 1A also illustrates a slimming phase 101. In FIG. 1A, the training phase 100 encompasses at least blocks 150, 160, 175, and 178. In block 150, a computer system obtains execution traces of an application. In an exemplary embodiment, the training phase 100 is performed a first time an application 135 is executed. As is known, each execution trace encompasses an application with a particular set of inputs. Another (different) trace could be obtained for the same application with a different set of inputs. The application 135 is an application binary (or, binary of an application). An application binary is a machine-executable file or memory image containing compiled and linked application source code. It is noted that an application binary is commonly referred to as a "binary", and thus the techniques herein will also refer to binary rewriting as rewriting that occurs on binaries of applications.

FIG. 1B illustrates the traces 110 that are obtained by the training phase 100. The training phase 100 can use a program to profile and dynamically generate execution traces 110 of the target application. Known techniques may be used for implementing execution profiling. In particular, the tool Pin may be used for this purpose, which is a well-known tool in this area. Pin constructs a new trace that begins with the branch target. Pin breaks the trace into basic blocks, each of which is a single entrance, single exit sequence of instructions.

The tracing is performed and the traces are collected at a basic block level in block 155. Each trace in a trace sequence corresponds to a basic block. In more detail, a trace comprises a tuple such as the following: <pid, tid, image name, offset, etc.>. Exemplary information that might be collected and form the tuple include the following information: pid (program identification, id); tid (thread id); image name; address offset; number of instructions; number of bytes; and/or function name. These are non-limiting, and more, different, or fewer items of information might be used. The term "trace point" refers to a single trace in a trace sequence. A trace point is output by the execution profiler for each basic block encountered during execution of the target application. A basic block may be, in an exemplary embodiment, defined by the information in the trace point (e.g., address of the beginning of the basic block is the "address offset" and the end of the basic block is "address offset"+ "number of bytes"). A basic block is a straight-line sequence of code that has no branches in except on entry and no branches out except on exit.

In block 160 of FIG. 1A, the training phase 100 generates a score for each basic block in the trace. Blocks 165 and 170 illustrate how block 160 might be performed. In block 165, the score represents the benefit of performing a binary slimming at that specific basic block. Block 170 illustrates that the score considers two factors: a) The portion of the binary (for that basic block) that can be removed; and b) How early an application can be rewritten.

FIG. 1B illustrates the scoring 115 and this creates scores 125-1 through 125-6 for each of the basic blocks 120-1 through 120-6, respectively. The basic blocks 120-1 through 120-6 are part of a control flow 130 of the application 135. In the example of FIG. 1B, each basic block 120 has a letter associated with it. Each letter indicates a different basic block. In this example, the basic block A has been executed twice. This is to illustrate that a basic block can be executed multiple times. Each instance of this basic block will get a different score (125-1 and 125-2 in this example), as the block will be represented as a separate trace point in the trace sequence. This is also the reason these are given reference numbers 120-1 and 120-2, to indicate they are represented as different trace points.

In block 175 of FIG. 1A, the training phase 100 chooses the block that has the highest score as a location (called the cutoff point) to start binary rewriting. This example illustrates that the same basic block A has been executed twice, as indicated by basic blocks 120-1 and 120-2 and corresponding scores 125-1 and 125-2. In the case that the highest utility value is at a basic block that has already been encountered in the trace, there are two ways to pick the cutoff point 190. A first way is illustrated by block 140, where the basic block 120 is picked that corresponds to the highest utility value. This embodiment requires implementing a context-sensitive breakpoint mechanism for pausing the target application 135 during the slimming phase 101. One example of a context-sensitive breakpoint mechanism is to keep a counter to track how many times the same breakpoint has been encountered. In this example, the second instance of the basic block A is illustrated as basic block 120-2 and the beginning instruction of the basic block A would be set as the breakpoint in the slimming phase 101, but a counter is used to determine that breakpoint has been reached twice. Thus, cutoff 190-1 is basic block 120-2. This is also illustrated as (ii) in block 181. Another exemplary embodiment is illustrated by block 145, where the very next basic block that has not yet been encountered in the trace is used as the cutoff point 190. In this example, the cutoff 190-2 is basic block 120-3, labeled with "B". This is illustrated as (iii) in block 181. Block 181 also illustrates a third situation (i), where a basic block with a highest score is chosen. This block would be executed once or the block could be executed multiple times, but the first execution has the highest score.

In the example of FIG. 1B, the highest score is score 125-2 of 0.3 for the basic block 120-2, and this is the cutoff point 190-1 for this example application 135, assuming that the context-sensitive breakpoint mechanism as in block 140 will be used; otherwise, the cutoff point 190-2 is chosen if block 145 has been performed. In block 178, the training phase 100 marks all basic blocks 120 that will no longer be used after the cutoff point 190 as candidates for removal during the binary rewriting phase. For FIG. 1B, all of basic blocks 120-3 through 120-6 will be marked in block 178. The marking may be performed via a list, called a blacklist, as one option, although other options are possible.

The second phase of the flow occurs as the slimming phase 101. In block 180 of FIG. 1A, the computer system performs binary rewriting of the application based at least on the chosen location. The rewriting could include removal of code in at least that block. The removal could include overwriting the code, e.g., with "no operation" (NOP) or other innocuous statements (e.g., trap instructions), such that the original code is removed via overwriting. The trap instructions (such as invalidOp) are instructions intended to crash the application or alert an administrator (admin). In the example of FIG. 1B, the chosen location is the cutoff 190-1, which is the basic block 120-2. In the binary rewriting phase, the rewriting starts when the application reaches block 120-2 (which assumes block 140 is implemented). The binary rewriting also considers the marking that occurred in block 178. In an exemplary embodiment, the rewriting is performed on all basic blocks that have been put on the blacklist. All blacklisted basic blocks have been determined not to be of any more use by block 178.

One example of the binary rewriting 180 is illustrated as blocks 182, 184, 186, 188, and 192. In block 182, the computer system sets a breakpoint based at least on the chosen location, which corresponds to the cutoff 190. In particular, the breakpoint can indicate the first instruction of a corresponding basic block 120 that has been selected as the cutoff point 190, although other locations in the code might be used. The breakpoint contrasts with but is related to the cutoff point, which is the basic block selected as a location to start binary rewriting. The breakpoint can indicate the first instruction of any one of the following (see block 181): (i) the basic block with highest score, in the case that this basic block is indicated by the trace as being executed once (e.g., or is executed multiple times but the first execution results in the highest score for this basic block as compared to all other basic blocks and other executions of this basic block); (ii) a context-sensitive breakpoint (e.g., determined using the breakpoint and a corresponding counter), in the case that this basic block is indicated by the trace as being executed multiple times; or (iii) the next basic block after block with highest score, in the case that the previous basic block is indicated by the trace as being executed multiple times. The latter version (iii) does not require the context-sensitive breakpoint of (ii).

In block 184, the computer system 400 executes the application. The computer system 400 at block 186 pauses the execution in response to the breakpoint (e.g., and counter value) being reached. The counter value is used (see (ii) in FIG. 1A) when the context-sensitive implementation of block 140 is used, and the counter value reaches a set point value. In FIG. 1B, this would be a value of two if the counter starts at zero and is incremented each time the basic block A (see FIG. 1B) is initially reached. If the context-sensitive embodiment is not being used (see (i) or (iii) in FIG. 1A), the breakpoint will be set corresponding to the cutoff 190, such as block 190-2 in FIG. 1B for (iii) of FIG. 1A.

In block 188, the computer system 400 removes certain ones of the basic blocks after the cutoff point (e.g., based at least on the blacklist) to create a rewritten application. At least the basic block 120 corresponding to the cutoff point 190 is removed. In an exemplary embodiment, any basic blocks marked in block 178, e.g., as being on the blacklist, will be removed. The rewritten application includes any remaining basic blocks that have not been removed. In block 192, the computer system 400 continues execution of the rewritten application. This involves executing any remaining basic blocks that have not been removed and that are in the control flow of the application. In additional detail, the trace captures all basic blocks that are executed by the application and the basic blocks in the blacklist are a subset of all basic blocks. The blacklist is constructed in such a way to ensure all basic blocks needed after the cutoff point are not added to the blacklist. The application execution continues after the breakpoint as if no rewriting has happened (since the basic blocks needed from the cutoff point onward are kept).

In an exemplary embodiment, the tracing in block 150 (and the other parts of training phase 100) is run each time the application is run with a new input set. If the application is rerun with the same input set, the expectation is that the subsequent analysis will yield the same results, hence there is no need to run additional traces for the same input set. If desired, these different traces and corresponding cutoff points and blacklists can be saved along with corresponding input sets, to enable appropriate selection of the cutoff points and blacklists based on a current input set for an execution of the application 135.

It is noted that the training phase 100 is described above as being performed via tracing for at least the first time the application 135 is executed. It may also be possible to perform a static type of analysis, such as a symbolic execution, or a hybrid approach, such as concolic execution, in order to obtain a basic block trace prior to actual execution of the application 135.

Further detail is now provided concerning the training phase 100. At a high-level, the algorithm performed by the training phase 100 scans each trace point in the target program's execution trace and scores each trace point (referred to as a basic block) using a utility function. The trace point with the highest score is the cutoff point 190. Additionally, as described above, all basic blocks that will no longer be used after the cutoff point 190 are marked as candidates for removal during the binary rewriting phase (block 180 of FIG. 1A).

Equations used for this are as follows:

$$Reduction_i = \frac{|Dead\ Instructions_i|}{|All\ instructions|} \quad (1)$$

$$Earliness_i = 1 - \left(\frac{i}{trace_{len}}\right)^{\frac{init_{len} \times a}{trace_{len}}} \quad (2)$$

$$Utility_{max} = \max_{0 \leq i \leq trace_{len}-1} Reduction_i \times Earliness_i \quad (3)$$

Equation (3) shows the utility function composing two terms: "Reduction", which is how much code is removed; and "Earliness", which is how soon after program execution binary rewriting starts. These correspond to (a) and (b), respectively, of block 170 of FIG. 1A. This utility function helps choose (via a maximum selection function, max) the trace location i so that the trace location will appear as earliest as possible before the "main loop" starts while maximizing the amount of code reduction. The location i means a location in traces [0 ... len(traces)−1], where "len" is length.

"Reduction" is represented as Equation (1), where "All instructions" denotes all instructions executed in profiling (i.e., tracing), while "Dead instructions;" means the instructions that do not appear after the ith trace.

Equation (2) shows that "Earliness" decreases as a trace location i approaches the end of the trace. The degree of the decrease depends on the length ("len") of the initialization phase in the trace which is denoted as "$init_{len}$". This value represents the portion of the application that performs initialization before reaching the "main loop". The length of the initialization phase is obtained by measuring the length of the trace resulting from profiling an application without any external inputs. This ensures that "earliness" is almost a maximum value during the initialization and "utility" is mostly dominated by "reduction". The variable a is a tunable constant, and the value of 20 was used in experimentation. The value may be, e.g., between 10 and 40 in an example. This value is, however, dependent on the applications and the value will vary. For instance, determination of the value might require some training and/or use of trial values.

Figure 2:
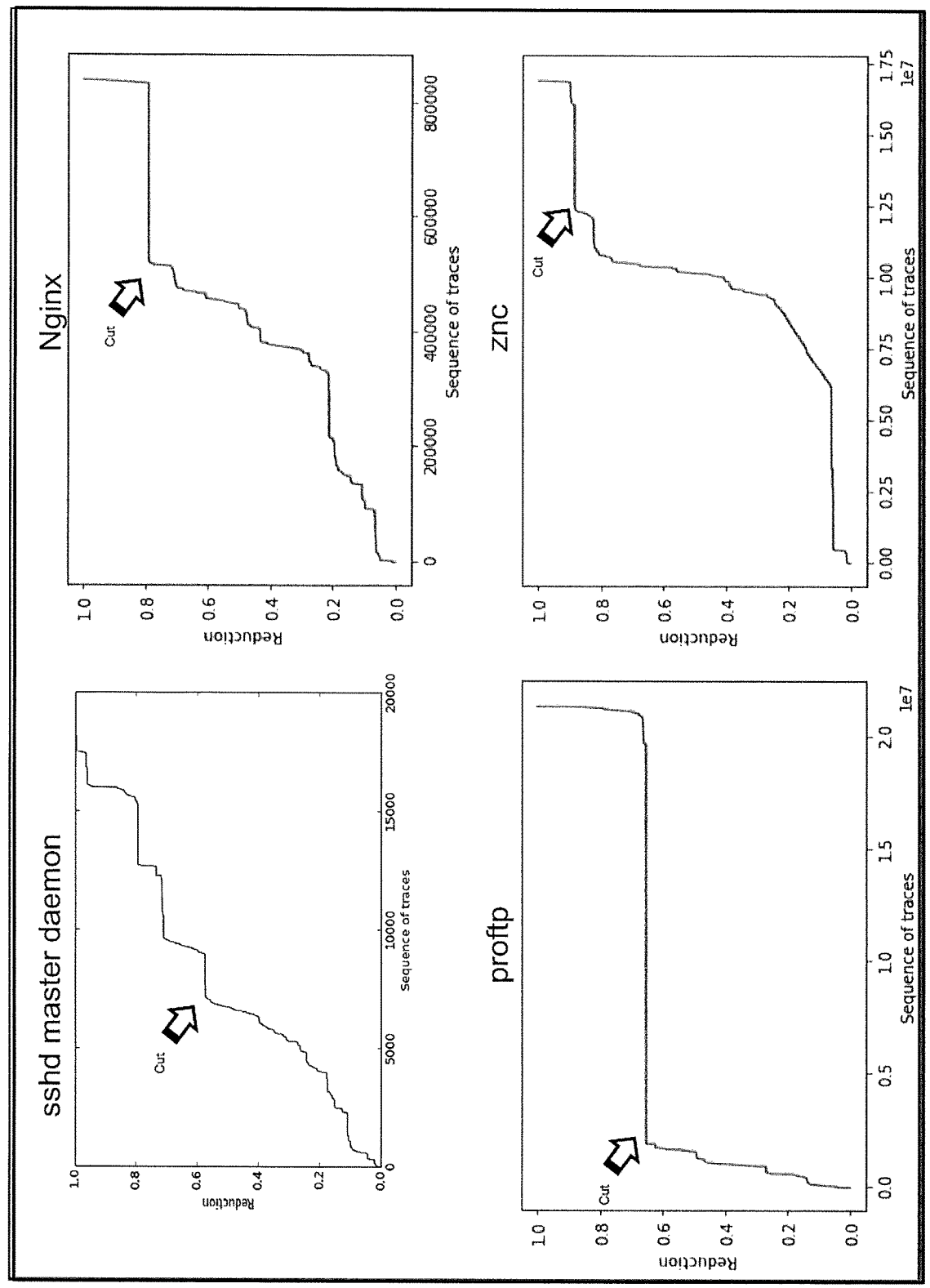
FIG. 2 shows a cumulative distribution function (CDF) showing the total code reduction at each trace point for four applications: sshd master daemon (upper left corner); Nginx (upper right corner); proftp (lower left corner); and znc (lower right corner)

FIG. 2 shows a cumulative distribution function (CDF) showing the total code reduction at each trace point for four applications: sshd master daemon (upper left corner); Nginx (upper right corner); proftp (lower left corner); and znc (lower right corner). Each figure has a sequence of traces on the abscissa and reduction on the ordinate. It was found that the discovered cutoff point ("cut" in FIG. 2) is well aligned with the start of main loop of the corresponding program when looking at the source code of the respective application. The "cut" arrow represents the highest utility value based on Equation (3). The applications that were evaluated also have similar traits in that the "reduction" increases steadily until "main loop" and the "reduction" remains constant during the main loop execution. One notable thing is that around 80% of instructions are dead after the cutoff point, which means there is a significant amount of code being used during the initialization phase of the application but that code is never used again during the "main loop".

Turning to FIG. 3, this figure is an illustration of a listing of code ("Listing 1"), illustrating an exemplary heuristic algorithm to find a rewriting location and blacklist in an exemplary embodiment. Listing 1 shows an exemplary overall algorithm in choosing the cutoff point to initiate binary rewriting and the selection of unused basic blocks for removal. The algorithm first calculates how many times each unique basic block is used during the trace. Then, for each trace point visited during the trace walk, the count is decreased by one. When this count reaches zero, it means that the corresponding basic block is no longer used in the trace from this trace point forward and the basic block is added into a blacklist. During the walk, the utility score is calculated as outlined above. Hence, at each trace point, both the utility score and a set of basic blocks that can be removed have been determined. Finally, the trace point with the highest utility score, indicating the cutoff point, ("rewritingLocation" in FIG. 3) and the associated blacklisted basic blocks ("blackList$_{final}$" in FIG. 3) are output (that is, returned in this example). The binary rewriting process (e.g., blocks 180 and 190 of FIG. 1A) would use these. This example uses a version where either (i) or (iii) from FIG. 1A is performed. This code can be modified to return a count of the number of times the basic block was entered, to allow for the context-sensitive break point embodiment of (ii) of FIG. 1A. For instance, the code might return the following:

rewritingLocation, count, blackList$_{final}$, where "count" is the number of times the basic_block has been visited, e.g., determined using the basic_block.visits. Note also that the blackList$_{final}$ in this example contains basic blocks that are not visited in the trace, and therefore can be removed.

Figure 4:
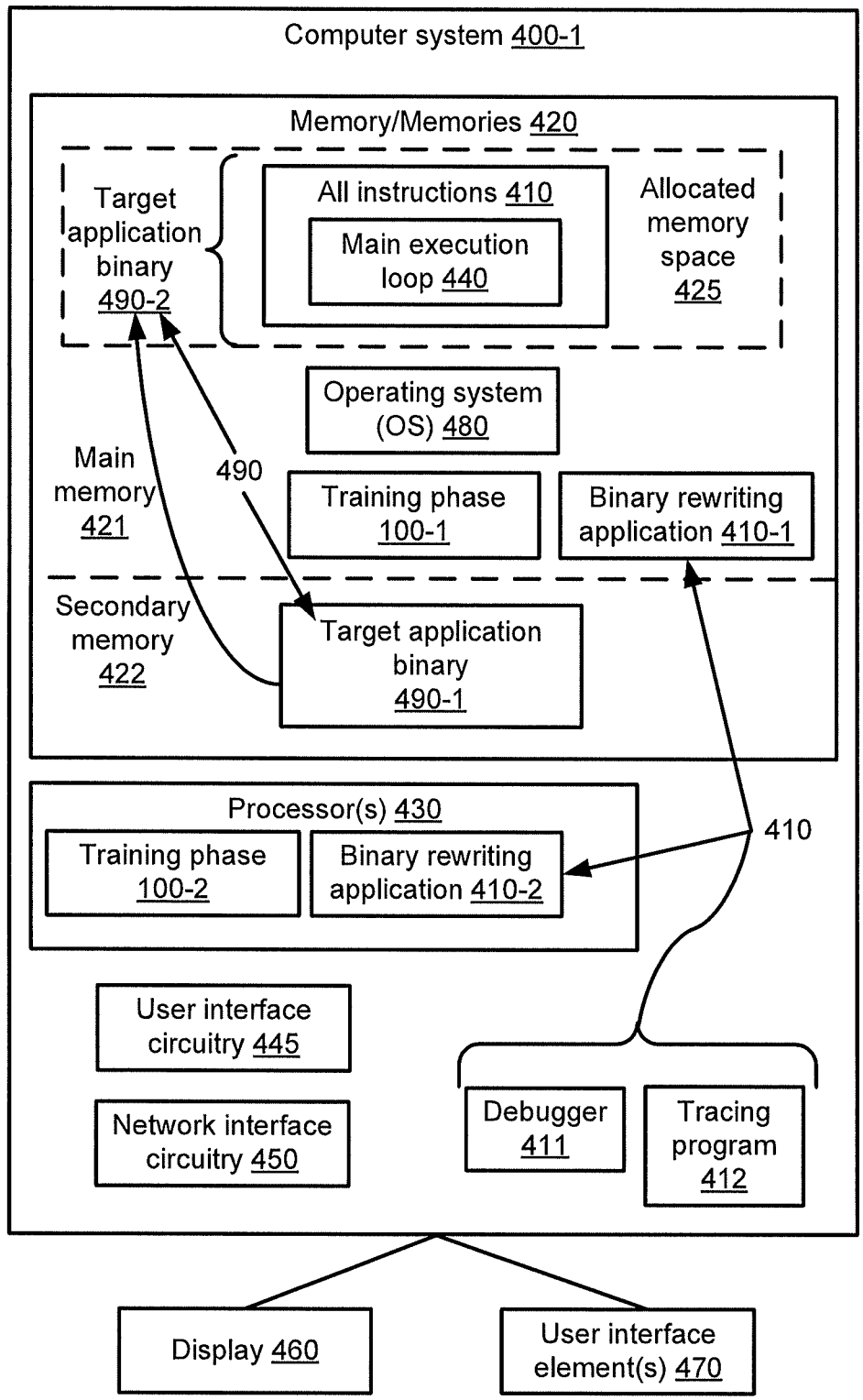
FIG. 4 is a block diagram of a computer system suitable for use with exemplary embodiments.

Referring to FIG. 4, a block diagram of one computer system 400, illustrated as computer system 400-1, is shown that is suitable for use with exemplary embodiments. An additional exemplary embodiment of a computer system 400-2 in the cloud context is also described below. Other computer systems 400 are also possible. The computer system 400-1 comprises one or more memories 420, one or more processors 430, user interface circuitry 445 and network interface circuitry 450. The computer system 400-1 is connected to (or comprises) a display 460 and one or more user interface elements 470.

The one or more memories 420 comprise a main memory 421 and a secondary memory 422 for this example. Main memory 421 (also called "primary" memory) is directly accessible by the one or more processors 430 and is typically volatile memory. The secondary memory 422 differs from main memory 421 in that it is not directly accessible by the one or more processors 430 and is typically non-volatile. A target application binary is generally referred to herein as target application binary 490. Target application binary 490 is an example of application 135. In this example, however, there is a "file" version of this, shown as target application binary 490-1 stored in secondary memory 422. There is also a "memory" version of this, shown stored in main memory 421 as target application binary 490-2. These can be treated differently, as explained in more detail below, and there may be differences in structure between the two (e.g., elements used for a file system in the secondary memory 422 might not be applicable to the main memory 421).

The main memory 421 in this example comprises all instructions 425, an operating system (OS) 480, a training phase 100-1, and a binary rewriting application 410-1. The all instructions 425 are all the instructions reachable by a target application binary 490-1, and this includes the main execution loop 440, which has been previously referred to as the "main loop".

The one or more processors 430 comprise training phase 100-2 and binary rewriting application 410-2. The one or more processors 430 are circuitry that causes the computer system 400-1 to perform the actions described herein. The one or more processors 430 may be general-purpose or special purpose processors (such as application specific integrated circuits), or other circuitry such as programmable logic or application specific integrated circuits.

The binary rewriting application 410 is an application that causes the computer system 400-1 to perform operations for application binary rewriting to reduce binary attack surface area, and implements the slimming phase 101 of FIG. 1A. The binary rewriting application 410 may be implemented in one or both of the one or more memories 420 and the one or more processors 430. As part of the one or more memories 420, the one or more processors 430 would access the binary rewriting application 410-1 in the one or more memories 420 and execute the instructions in the application 410-1, in order to cause the computer system 400-1 to carry out operations. The binary rewriting application 410-2 in the one or more processors 430 can be a representation of instructions fetched from the one or more memories. Alternatively or in addition, the binary rewriting application 410-1 in the one or more processors 430 may be a representation of hardware instructions that are built into the one or more processors 430 and cause the computer system 400-1 to perform operations when executed.

Similarly, the training phase 100 may be implemented in the training phase 100-1, as code, and loaded into the one or more processors 430. Alternatively or in addition, the training phase 100 may be implemented in circuitry as training phase 100-2 and part of the one or more processors 430 (or through other circuitry).

The binary rewriting application 410 may comprise or have access to and use a debugger 411 and/or a tracing program 412. These may be used to analyze and trace target application binary 490 in order to, e.g., determine the all instructions 425 and to help with and enable the application binary rewriting described herein.

The OS 480 controls many of the operations of the computer system 400-1 and performs memory management and the like. The binary rewriting application 410-1 may be implemented in whole or in part in the OS 480 or implemented separately from the OS 480. The OS 480 assigns an allocated memory space 425 to the target application binary 490-2 (e.g., and therefore to all instructions 425). It is noted that the OS 480 and the other applications described herein would also have allocated memory spaces, but these are not shown. The target application binary 490 is also shown residing in the secondary memory 422 (see 490-1), and the target application binary 490-1 would be loaded into main memory 421, e.g., in the allocated memory space 425 as target application binary 490-2, for subsequent retrieval and execution by the one or more processors 430.

The one or more memories 420 may include non-volatile storage memories (e.g., for secondary memory 422) such as memory sticks, solid state drives, firmware, and/or hard drives, and may include volatile memories (e.g., for main memory 421) such as static RAM, dynamic RAM, registers, and/or cache memory.

The display 460 (if used) may be a touch screen or non-touch screen, and the computer system 400-1 interfaces with the display 460 via the user interface circuitry 445 (e.g., such as through a graphics processing unit, possibly as part of the one or more processors 430). The user interface element(s) 470, if used, could include keyboards, mice, and other user interface elements, and the computer system 400-1 interfaces with these via the user interface circuitry 445. The network interface circuitry 450 may include one or both of a wired network interface and a wireless network interface.

The computer system 400-1 may be any system able to implement the examples herein, such as personal computers, laptops, servers, smartphones, televisions, audio processing devices such as receivers, and the like. These are merely exemplary and not meant to be limiting.

In block 180 of FIG. 1A, binary rewriting is performed. One option for this is to perform the binary rewriting dynamically. In this case, the binary rewriting would occur dynamically in response to the application being loaded into memory but before executing the first instruction of the application, instead of statically performing this rewriting. This operation will be performed by, e.g., a tracing program 412/debugger 411. In more detail and in an exemplary embodiment, the tracing 412/debugging 411 program would load the target application into volatile memory (main memory 421), the tracing/debugging program performs the rewrite (block 180 of FIG. 1A) of application binary residing in volatile memory, then executes (block 190 of FIG. 1A) the application code. The changes only occur to the binary 490-2 in volatile memory (main memory 421) but do not affect the binary 490-1 in non-volatile memory (secondary memory 422) in this example. Meaning the next time the application binary 490 is loaded, the rewriting is performed again. Note in the static rewriting case, changes are made to the non-volatile binary 490-1, hence the changes will be there every time the application 490 is loaded into volatile memory (main memory 421) for execution. Another possibility is that during the dynamic binary rewriting process, the resultant modified application is (e.g., 490-1) is stored in the main memory 421 and then will be executed in lieu of the target application binary 490-2.

In block 190 of FIG. 1A, the computer system 400-1 executes the target application binary 190-2 (e.g., while) using a tracing program 412 or a debugger 411 (such as Radare2). It is possible that the tracing program 412 or debugger 411 causes (e.g., under control of the binary rewriting application 410) execution of the target application binary 490-2. It is also possible that the target application binary 490-2 executes (e.g., under control of the binary rewriting application 410) and the tracing program 412 or debugger 411 executes in parallel with the execution of the target application binary 490-2. As also indicated by FIG. 4, the binary rewriting application 110 may include one or both of the tracing program 412 or debugger 411 or their functionality.

It is to be understood that although this disclosure below includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
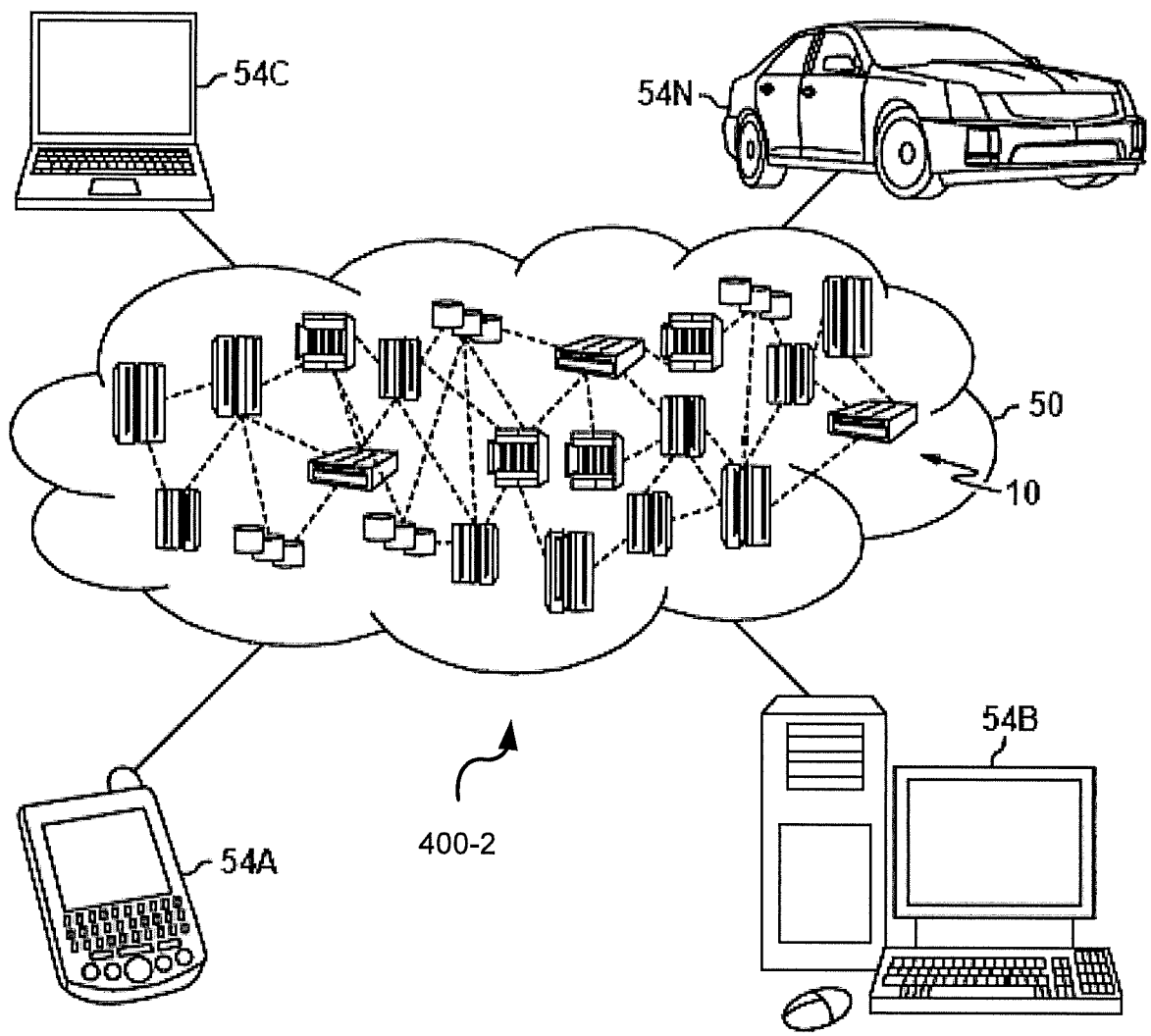
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The cloud computing environment 50, such as through one or more nodes 10, can implement the computer system 400-2 and perform the exemplary embodiments described herein. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
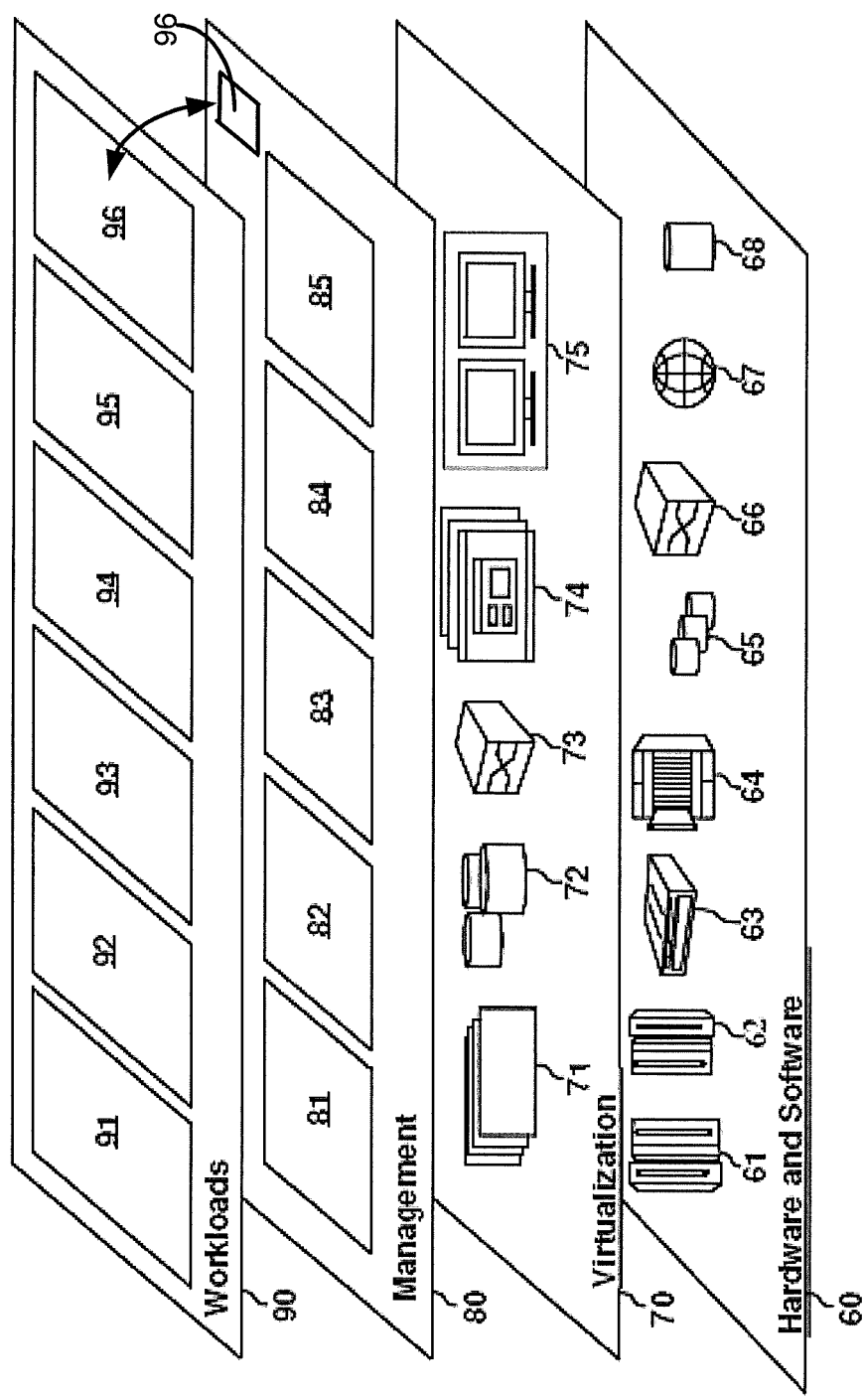
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and runtime binary slimming process 96. Runtime binary slimming process 96 performs the exemplary embodiments described herein, and may also be implemented in part in the management layer 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
accessing multiple execution traces of an application, wherein the multiple execution traces have been collected at a basic block level for first executions of the application with different sets of inputs;
scoring basic blocks in the multiple execution traces, wherein scores for the basic blocks represent benefits of performing binary slimming at the corresponding basic blocks, and wherein the scores consider two factors: a portion of binary code that can be removed based on a corresponding basic block; and how early an application can be rewritten in runtime binary slimming; and
performing runtime binary slimming of the application at runtime based on the scores of the basic blocks, the runtime binary slimming performed at least by removing at least a basic block set as a cutoff point from the application so that at least the basic block set as the cutoff point is not executed in a further execution of the application.

2. The method of claim 1, wherein the removing comprises overwriting code in the basic block with one or both of no operation instructions or trap instructions.

3. The method of claim 1, wherein the method further comprises marking basic blocks that will no longer be used after the cutoff point as candidates for removal during the runtime binary slimming; and wherein the removing further comprises removing the basic blocks marked as candidates for removal from the application so that these basic blocks are not executed in the further execution.

4. The method of claim 1, wherein the basic block set as a cutoff point is a basic block having been scored with a highest score of multiple basic blocks in the multiple execution traces.

5. The method of claim 4, further comprising setting a breakpoint based on the basic block set as the cutoff point, the breakpoint part of code of the basic block; and wherein the removing comprises removing at least the basic block having the breakpoint based on reaching the breakpoint a given multiple number of times.

6. The method of claim 1, wherein the cutoff point is a next basic block after a basic block has been reached multiple times during execution of the application for the multiple execution traces, the basic block that has been reached multiple times having been scored with a highest score of multiple basic blocks in the multiple execution traces.

7. The method of claim 1, wherein:
the method further comprises setting at least a breakpoint based on the basic block set as the cutoff point;
the performing runtime binary slimming of the application further comprises for the further execution:
executing the application until the breakpoint is reached;
pausing execution of the application in response to the breakpoint being reached;
the removing comprises removing at least the basic block set as the cutoff point and removing other basic blocks that have been marked as candidates for removal from the application so that the removed basic blocks are not executed for the further execution; and
the performing runtime binary slimming of the application further comprises continuing, after the removing, executing, in the further execution, basic blocks of the application that have not been removed.

8. The method of claim 1, wherein the scores are determined using the following equation:

$$Utility_{max} = \max_{0 \leq i \leq trace_{len-1}} Reduction_i \times Earliness_i,$$

where $Utility_{max}$ is a maximum utility, max is a maximum selection function, the location i is varied from zero to $trace_{len-1}$, which encompasses a length (len) of a given trace, $$Reduction_i = \frac{|\text{Dead Instructions}_i|}{|\text{All instructions}|},$$

where Dead Instructions$_i$ means instructions that do not appear after the ith trace, and All instructions denotes all instructions executed in profiling, and $$Earliness_i = 1 - \left(\frac{i}{trace_{len}}\right)^{\frac{init_{len} \times \alpha}{trace_{len}}},$$

where $init_{len}$ is a length of an initialization part in the given trace, and the variable a is a selected constant.

9. An apparatus, comprising:
one or more memories having computer-readable code thereon; and
one or more processors, the one or more processors, in response to retrieval and execution of the computer-readable code, causing the apparatus to perform operations comprising:
accessing multiple execution traces of an application, wherein the multiple execution traces have been collected at a basic block level;
scoring basic blocks in the multiple execution traces, wherein scores for the basic blocks represent benefits of performing binary slimming at the corresponding basic blocks, and wherein the scores consider two factors: a portion of binary code that can be removed based on a corresponding basic block; and how early an application can be rewritten in runtime binary slimming; and
performing runtime binary slimming of the application at runtime based on the scores of the basic blocks, the runtime binary slimming performed at least by removing at least a basic block set as a cutoff point from the application so that at least the basic block set as the cutoff point is not executed in a further execution of the application.

10. The apparatus of claim 9, wherein the removing comprises overwriting code in the basic block with one or both of no operation instructions or trap instructions.

11. The apparatus of claim 9, wherein the one or more processors, in response to retrieval and execution of the computer-readable code, further cause the apparatus to perform additional operations comprising: marking basic blocks that will no longer be used after the cutoff point as candidates for removal during the runtime binary slimming; and wherein the removing further comprises removing the basic blocks marked as candidates for removal from the application so that these basic blocks are not executed in the further execution.

12. The apparatus of claim 9, wherein the basic block set as a cutoff point is a basic block having been scored with a highest score of multiple basic blocks in the multiple execution traces.

13. The apparatus of claim 12, wherein the one or more processors, in response to retrieval and execution of the computer-readable code, further cause the apparatus to perform additional operations comprising: setting a breakpoint based on the basic block set as the cutoff point, the breakpoint part of code of the basic block; and wherein the removing comprises removing at least the basic block having the breakpoint based on reaching the breakpoint a given multiple number of times.

14. The apparatus of claim 9, wherein the cutoff point is a next basic block after a basic block has been reached multiple times during execution of the application for the multiple execution traces, the basic block that has been reached multiple times having been scored with a highest score of multiple basic blocks in the multiple execution traces.

15. The apparatus of claim 9, wherein:
the wherein the one or more processors, in response to retrieval and execution of the computer-readable code, further cause the apparatus to perform additional operations comprising setting at least a breakpoint based on the basic block set as the cutoff point;
the performing runtime binary slimming of the application further comprises for the further execution:
executing the application until the breakpoint is reached;
pausing execution of the application in response to the breakpoint being reached;
the removing comprises removing at least the basic block set as the cutoff point and removing other basic blocks that have been marked as candidates for removal from the application so that the removed basic blocks are not executed for the further execution; and
the performing runtime binary slimming of the application further comprises continuing, after the removing, executing, in the further execution, basic blocks of the application that have not been removed.

16. A computer program product comprising a computer readable storage medium having program instructions embodied therewith, the program instructions executable by a computer system to cause the computer system to perform operations comprising:
accessing multiple execution traces of an application, wherein the multiple execution traces have been collected at a basic block level;
scoring basic blocks in the multiple execution traces, wherein scores for the basic blocks represent benefits of performing binary slimming at the corresponding basic blocks, and wherein the scores consider two factors: a portion of binary code that can be removed based on a corresponding basic block; and how early an application can be rewritten in runtime binary slimming; and
performing runtime binary slimming of the application at runtime based on the scores of the basic blocks, the runtime binary slimming performed at least by removing at least a basic block set as a cutoff point from the application so that at least the basic block set as the cutoff point is not executed in a further execution of the application.

17. The computer program product of claim 16, wherein the cutoff point is a next basic block after a basic block has been reached multiple times during execution of the application for the multiple execution traces, the basic block that has been reached multiple times having been scored with a highest score of multiple basic blocks in the multiple execution traces.

18. The computer program product of claim 16, wherein:
the program instructions further cause the computer system to perform operations comprising: setting at least a breakpoint based on the basic block set as the cutoff point;
the performing runtime binary slimming of the application further comprises in the further execution:
executing the application until the breakpoint is reached;
pausing execution of the application in response to the breakpoint being reached;

the removing comprises removing at least the basic block set as the cutoff point and removing other basic blocks that have been marked as candidates for removal from the application so that the removed basic blocks are not executed in the further execution; and the performing runtime binary slimming of the application further comprises continuing, after the removing, executing, in the further execution, basic blocks of the application that have not been removed.

\* \* \* \* \*